(12) United States Patent  (10) Patent No.: US 8,434,305 B2
Donkin et al.  (45) Date of Patent: May 7, 2013

(54) COMPRESSED-AIR-ASSISTED TURBOCHARGER SYSTEM FOR INTERNAL COMBUSTION ENGINE

(75) Inventors: Gavin Donkin, Lorraine (FR); Peter Davies, Lorraine (FR)

(73) Assignee: Honeywell International Inc., Morristown, NJ (US)

( * ) Notice: Subject to any disclaimer, the term of this patent is extended or adjusted under 35 U.S.C. 154(b) by 414 days.

(21) Appl. No.: 12/775,166

(22) Filed: May 6, 2010

(65) Prior Publication Data

US 2011/0271672 A1  Nov. 10, 2011

(51) Int. Cl.
*F02B 33/44* (2006.01)
(52) U.S. Cl.
USPC .......................... 60/611; 60/605.1; 123/559.1
(58) Field of Classification Search .................... 60/611, 60/605.1; 123/559.1
See application file for complete search history.

(56) References Cited

U.S. PATENT DOCUMENTS

| 3,673,796 | A |   | 7/1972 | Weick et al. |
| 4,517,803 | A |   | 5/1985 | Jamison |
| 5,064,423 | A |   | 11/1991 | Lorenz et al. |
| 5,819,538 | A | * | 10/1998 | Lawson, Jr. ..................... 60/611 |
| 2008/0072595 | A1 |   | 3/2008 | Nemeth et al. |

* cited by examiner

*Primary Examiner* — Ching Chang
(74) *Attorney, Agent, or Firm* — Alston & Bird LLP

(57) ABSTRACT

A turbocharger system for an internal combustion engine that powers a vehicle having a pressure vessel storing pressurized air. The turbocharger system comprises a turbocharger and a valve system. The system is configured such that the air intake system of the internal combustion engine can be supplied with air at super-atmospheric pressure either from the compressor of the turbocharger or from the pressure vessel. When the pressure vessel is supplying the intake system, compressed air from the compressor is recirculated back to the air inlet of the compressor so as to help prevent a surge condition in the compressor.

5 Claims, 6 Drawing Sheets

COMPRESSED-AIR-ASSISTED TURBOCHARGER SYSTEM FOR INTERNAL COMBUSTION ENGINE

BACKGROUND OF THE INVENTION

The present disclosure relates to exhaust gas-driven turbochargers for internal combustion engines.

The transient response of internal combustion engines in passenger vehicles and trucks is a critical parameter in terms of overall driveability and efficiency of the engine system. When the engine is boosted by an exhaust gas-driven turbocharger, it is often difficult to provide sufficient air to the engine at low engine speeds so as to rapidly accelerate the engine and vehicle. This is due in part to the low exhaust gas energy and hence low turbine power extraction at low engine speed.

One approach that has been proposed for alleviating this poor responsiveness at low engine speeds, specifically for medium- and heavy-duty trucks, is to use pressurized air from the air cylinders of the truck's air-assisted brake system (or from a separate pressure vessel charged by the air-assisted brake system) to supply air to the engine intake system at low engine speeds. Such proposals typically employ a three-way valve having two inlets and one outlet. One inlet is connected to the compressor and the other inlet is connected to the air cylinder. The valve can be operated to supply either the compressor discharge air or the pressurized air from the air cylinder through the valve outlet to the engine intake.

A drawback of this approach is that when the valve is positioned to shut off the compressor air flow to the engine, the compressor can become unstable and possibly go into a surge condition, which can create unwanted vibration and noise and/or can damage the turbocharger bearing system.

BRIEF SUMMARY OF THE DISCLOSURE

The present disclosure relates to a turbocharger system for an internal combustion engine that powers a vehicle having a pressure vessel storing pressurized air. The turbocharger system comprises a turbocharger and a valve system. The system is configured such that the air intake system of the internal combustion engine can be supplied with air at super-atmospheric pressure either from the compressor of the turbocharger or from the pressure vessel. When the pressure vessel is supplying the intake system, compressed air from the compressor is recirculated back to the air inlet of the compressor so as to help prevent a surge condition in the compressor.

In accordance with one embodiment described herein, the valve system is arranged to receive compressed air from the compressor and to separately receive pressurized air from the pressure vessel. The valve system is electrically controllable to move between first and second valve conditions in which either the pressurized air from the pressure vessel or the compressed air from the compressor is supplied to the intake system of the engine, respectively, the valve system shutting off the pressure vessel when in the second valve condition. The valve system is further operable, when in the first valve condition, to divert the compressed air from the compressor into a recirculation conduit that leads into the air inlet of the compressor, such that compressed air is recirculated back to the compressor when the air intake system is being supplied by the pressure vessel. An electronic controller (e.g., the vehicle ECU) can be programmed to control the valve system to move it between the first and second conditions as a function of one or more measured engine performance parameters.

The valve system can be of various configurations. For example, in one embodiment the valve system comprises a single valve defining a first inlet receiving the pressurized air from the pressure vessel, a second inlet receiving the compressed air from the compressor, a main outlet through which air is discharged for supply to the intake system of the engine, and a recirculation outlet through which compressed air received at the second inlet is recirculated through the recirculation conduit back to the compressor. In the first valve condition, the valve is configured to connect the first inlet to the main outlet and to connect the second inlet to the recirculation outlet. In the second valve condition, the valve is configured to connect the second inlet to the main outlet and to close off the flow of pressurized air received at the first inlet.

In another embodiment, the valve system comprises a control valve and a separate recirculation valve. The control valve defines a first inlet receiving the pressurized air from the pressure vessel, a second inlet receiving the compressed air from the compressor, and an outlet through which air is discharged for supply to the intake system of the engine. The recirculation valve defines an inlet receiving the compressed air from the compressor, an outlet through which the compressed air received at the inlet is discharged for supply to the second inlet of the control valve, and a recirculation outlet through which compressed air received at the inlet is recirculated through the recirculation conduit back to the compressor. Thus, the first valve condition of the valve system is characterized by the recirculation valve being positioned to recirculate the compressed air from the compressor through the recirculation conduit back to the compressor and the control valve being positioned to supply the pressurized air from the pressure vessel to the intake system of the engine. The second valve condition of the valve system is characterized by the recirculation valve being positioned to pass the compressed air from the compressor on to the second inlet of the control valve and the control valve being positioned to supply the compressed air through the outlet of the control valve to the intake system of the engine.

In yet another embodiment, the valve system comprises a pressure vessel valve and a separate recirculation valve. The pressure vessel valve is arranged to receive pressurized air from the pressure vessel, to supply the pressurized air to the intake system when the pressure vessel valve is in an open condition, and to prevent supply of the pressurized air to the intake system when the pressure vessel valve is in a closed condition. The recirculation valve is arranged to receive compressed air from the compressor, to supply the compressed air to the intake system when the recirculation valve is in a non-recirculation condition, and to recirculate the compressed air through the recirculation conduit back to the compressor when the recirculation valve is in a recirculation condition. Thus, the first valve condition of the valve system is characterized by the recirculation valve being in the recirculation condition and the pressure vessel valve being in the open condition, and the second valve condition of the valve system is characterized by the recirculation valve being in the non-recirculation condition and the pressure vessel valve being in the closed condition.

It is thus apparent that the particular details of the valve system are not critical, as long as the valve system functions to recirculate compressed air from the compressor back to the air inlet of the compressor when the pressure vessel is supplying the engine intake system.

The present disclosure also describes methods for operating a turbocharger system for an internal combustion engine. In one embodiment, a method for operating a turbocharger system for an internal combustion engine comprises the steps of (1) providing a turbocharger including a compressor driven by a turbine, the turbine defining an exhaust gas inlet for receiving exhaust gas from the engine and an exhaust gas outlet through which exhaust gas is discharged, the compressor defining an air inlet for receiving air to be compressed and an air outlet through which compressed air is discharged for delivery to an intake system of the engine; (2) providing a pressure vessel containing pressurized air; (3) selectively supplying an intake system of the engine with air either from the compressor or from the pressure vessel, dependent on at least one performance parameter of the engine; and (4) when the pressure vessel is supplying the air to the intake system, recirculating compressed air from the air outlet of the compressor back to the air inlet of the compressor.

In one embodiment, the at least one performance parameter of the engine includes engine speed. For example, the intake system can be supplied by the pressure vessel when engine speed is below a predetermined value, and the intake system can be supplied by the compressor when engine speed is above the predetermined value. This is a simple scheme for deciding whether the pressure vessel or the compressor is to supply the air to the engine. More-complex schemes of course can be employed, if desired. For instance, both engine speed and another parameter (e.g., engine throttle setting) can be factored into the decision. Thus, the pressure vessel may supply the engine only when engine speed is below a predetermined value and engine throttle setting is above a predetermined level, and otherwise the compressor supplies the engine. [Feel free to alter this description—these are just my musings.]

BRIEF DESCRIPTION OF THE SEVERAL VIEWS OF THE DRAWING(S)

Having thus described the disclosure in general terms, reference will now be made to the accompanying drawings, which are not necessarily drawn to scale, and wherein:

DETAILED DESCRIPTION OF THE DRAWINGS

The turbocharger system now will be described more fully hereinafter with reference to the accompanying drawings in which some but not all possible embodiments are shown. Indeed, the turbocharger and actuator may be embodied in many different forms and should not be construed as limited to the embodiments set forth herein; rather, these embodiments are provided so that this disclosure will satisfy applicable legal requirements. Like numbers refer to like elements throughout.

Figure 1A:
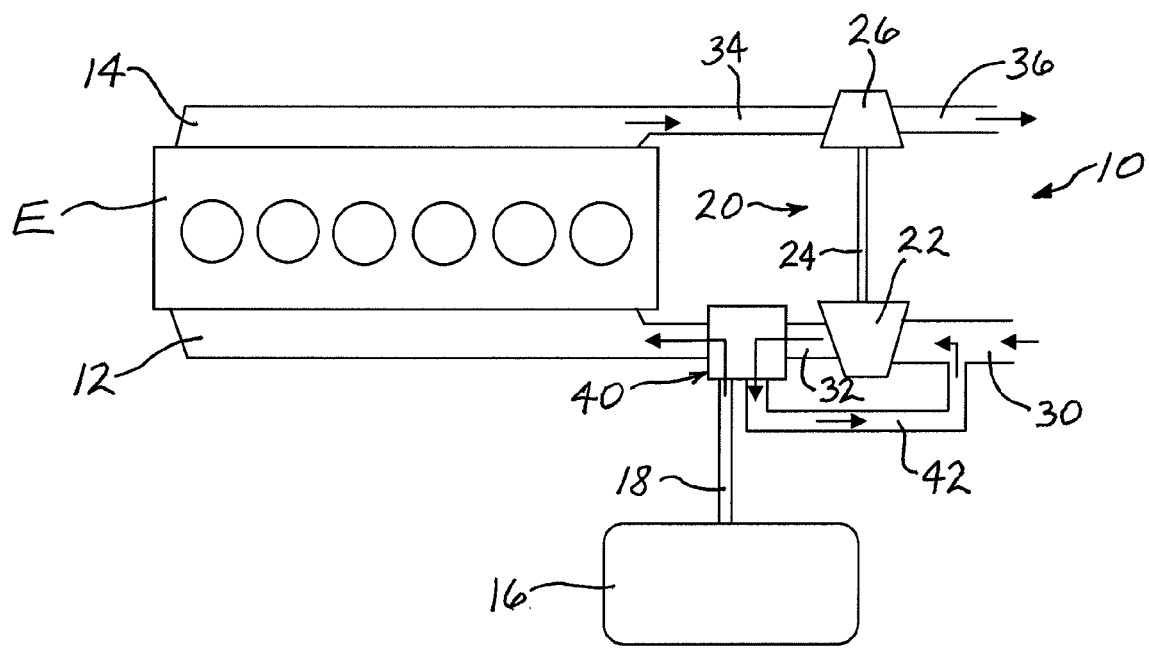
FIG. 1A is a diagrammatic illustration of a turbocharger system in accordance with a first embodiment of the invention, with the valve system in a first condition.
Figure 1B:
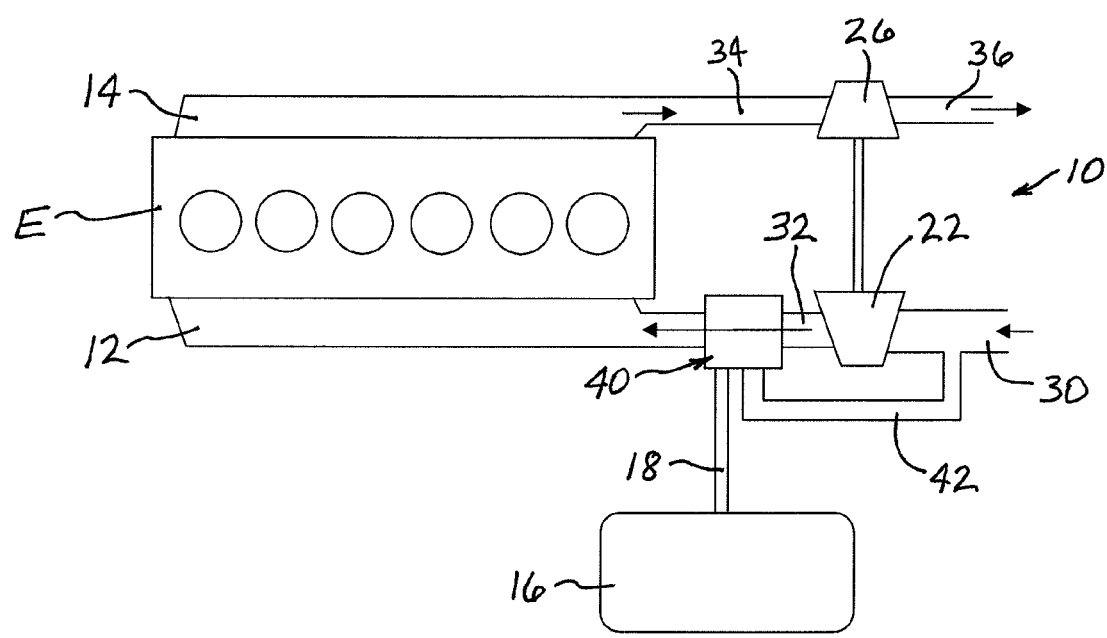
FIG. 1B shows the system of FIG. 1A with the valve system in a second condition.

A turbocharger system 10 according to one embodiment of the invention is depicted in FIGS. 1A and 1B. The turbocharger system is shown in conjunction with an internal combustion engine E having an air intake system 12 for supplying air to the cylinders of the engine and an exhaust system 14 for conveying exhaust gases from the cylinders away from the engine. The vehicle of which the engine E is a part includes a pressure vessel 16 that stores pressurized air at a pressure sufficient for supercharging the engine at low engine speeds. The pressure vessel can be, for example, an air cylinder of an air-assisted braking system for the vehicle. Alternatively the pressure vessel can be a dedicated pressure vessel separate from the braking system. In either case, the pressure vessel is charged by operation of a pump (not shown).

The turbocharger system 10 includes a turbocharger 20 having a compressor 22 coupled by a shaft 24 to a turbine 26. An air inlet 30 supplies fresh air into the compressor 22. The compressor compresses the air and supplies it via an air conduit 32 to the air intake system 12 of the engine. The exhaust system 14 of the engine is connected to an exhaust conduit 34 that supplies the exhaust gas to the turbine 26. After passing through the turbine 26 the exhaust gas is conveyed away through a further exhaust line 36 to one or more downstream devices such as exhaust gas treatment devices (not shown).

The turbocharger system 10 further comprises a valve system 40 arranged to receive compressed air from the compressor 22 via the air conduit 32, and to separately receive pressurized air from the pressure vessel 16 via a line 18. The valve system 40 is electrically controllable by a suitable controller (e.g., the vehicle's ECU) to move between first and second valve conditions in which either the pressurized air from the pressure vessel 16 or the compressed air from the compressor 22 is supplied to the intake system 12 of the engine, respectively. The valve system shuts off the pressure vessel 16 when in the second valve condition.

The valve system 40 is further operable, when in the first valve condition, to divert the compressed air from the compressor 22 into a recirculation conduit 42 that leads into the air inlet 30 of the compressor 22, such that compressed air from the compressor is recirculated back to the compressor inlet when the air intake system 12 is being supplied by the pressure vessel 16.

The valve system 40 in this embodiment comprises a single valve having two inlets and two outlets. Specifically, the valve has a first inlet supplied by the line 18 from the pressure vessel 16 and a second inlet supplied by the conduit 32 from the compressor 22. The valve has a main outlet through which air is discharged for supply to the intake system 12 of the engine, and a recirculation outlet connected to the recirculation conduit 42. The valve is variably positionable. In a first position of the valve as shown in FIG. 1A, suitable for engine conditions in which the compressor 22 is unable to supply adequate quantities of sufficiently supercharged air to the engine, the first inlet for the pressure vessel 16 is connected to the main outlet, and the second inlet for the compressor 22 is connected to the recirculation conduit 42. Thus, the engine's intake system 12 is supplied with pressurized air from the pressure vessel 16 and the compressed air from the compressor 22 is recirculated back to the compressor inlet to help avoid instability and/or surge of the compressor as long as the valve is in the first position.

In a second position of the valve as shown in FIG. 1B, suitable for engine conditions in which the compressor 22 is able to properly supply the engine with air, the second inlet for the compressor 22 is connected to the main outlet and the first inlet for the pressure vessel 16 is closed off, as is the recirculation outlet. Thus, the engine's intake system 12 is supplied with compressed air from the compressor 22 in the usual fashion and the pressure vessel 16 is no longer involved in supercharging the engine.

Figure 2A:
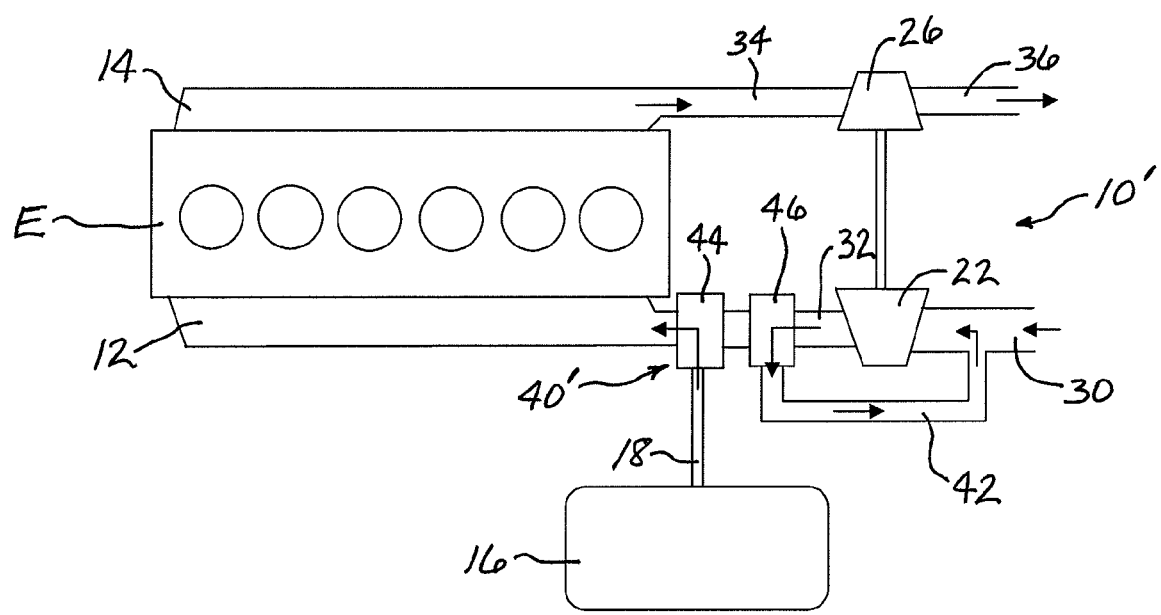
FIG. 2A is a diagrammatic illustration of a turbocharger system in accordance with a second embodiment of the invention, with the valve system in a first condition.
Figure 2B:
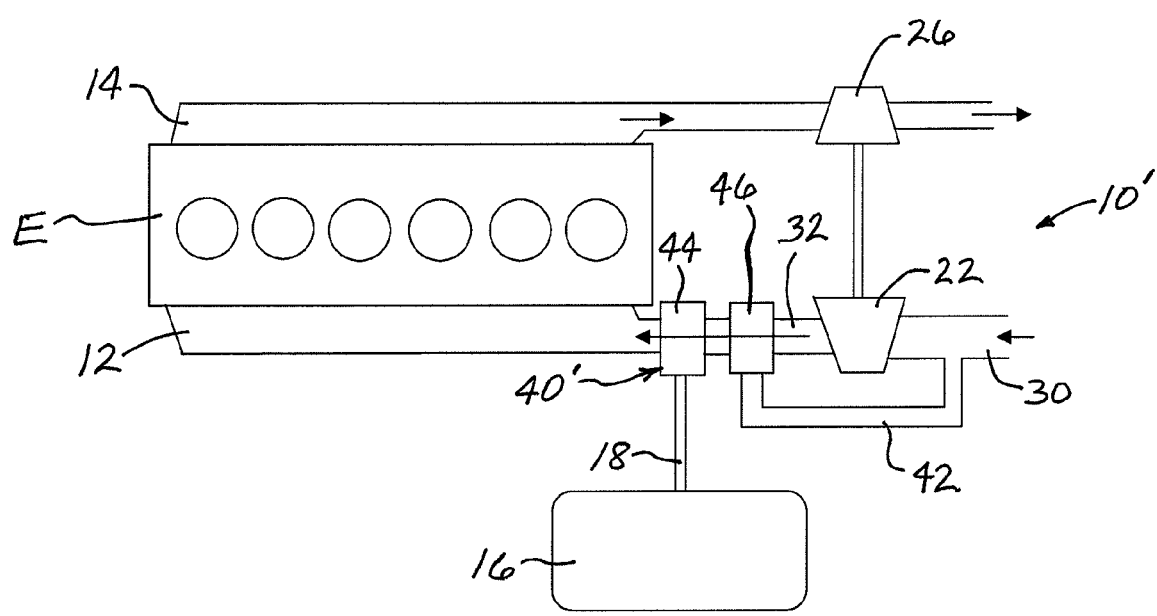
FIG. 2B shows the system of FIG. 2A with the valve system in a second condition.

FIGS. 2A and 2B depict a turbocharger system 10' in accordance with another embodiment. The turbocharger system 10' is substantially similar to that of FIG. 1, and only the significant differences are described here. The primary difference is that a valve system 40' is substituted for the valve system 40 of the first embodiment. The valve system 40' comprises two valves: a control valve 44 and a recirculation valve 46. The control valve 44 has a first inlet that receives pressurized air from the pressure vessel 16 via the line 18, and a second inlet that receives compressed air from the compressor 22 via the conduit 32. The recirculation valve 46 is disposed in the conduit 32 and has an inlet that receives compressed air from the compressor 22. The recirculation valve 46 has an outlet through which the received air is fed via the conduit 32 into the second inlet of the control valve 44. The recirculation valve 46 also has a recirculation outlet connected to the recirculation conduit 42.

As shown in FIG. 2A, at engine conditions in which the compressor 22 is unable to supply adequate quantities of sufficiently supercharged air to the engine, the control valve 44 is placed in a first position in which the first inlet fed by the pressure vessel 16 is connected to the outlet of the valve such that the engine's intake system 12 is supplied with air from the pressure vessel 16, and the recirculation valve 46 is placed in a recirculation position in which the valve's inlet is connected to the recirculation outlet such that compressed air from the compressor 22 is recirculated via the recirculation conduit 42 to the inlet 30 of the compressor, and the valve's outlet leading to the control valve 44 is closed off.

As shown in FIG. 2B, at engine conditions in which the compressor 22 is able to properly supercharge the engine, the control valve 44 is placed in a second position in which the first inlet fed by the pressure vessel 16 is closed off and the second inlet fed by the compressor 22 is connected to the outlet of the valve such that the intake system 12 is supplied with air from the compressor 22, and the recirculation valve 46 is placed in a non-recirculation position in which the valve's inlet is connected to the outlet that feeds the control valve 44 and the recirculation outlet is closed off.

Figure 3A:
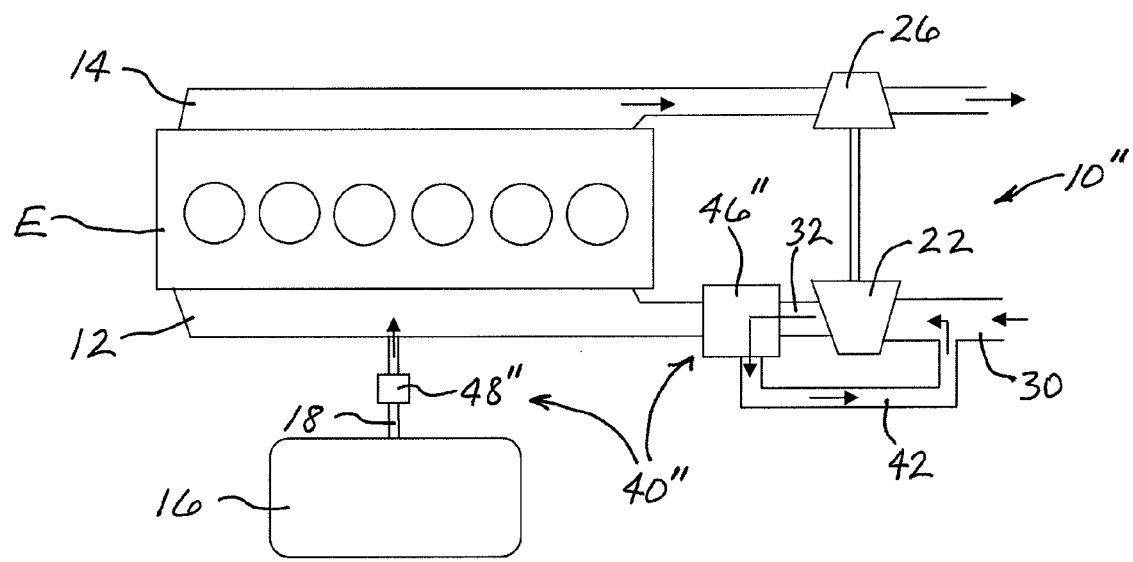
FIG. 3A is a diagrammatic illustration of a turbocharger system in accordance with a third embodiment of the invention, with the valve system in a first condition.
Figure 3B:
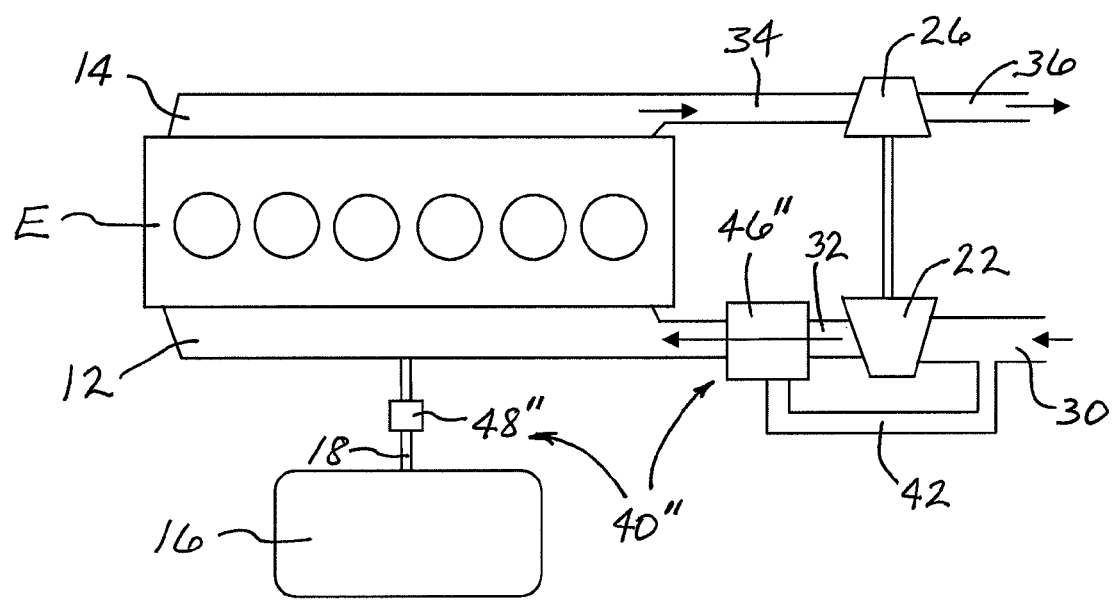
FIG. 3B shows the system of FIG. 3A with the valve system in a second condition.

A third embodiment of a turbocharger system 10" is depicted in FIGS. 3A and 3B. This system is substantially similar to the previous embodiments and only the significant differences will be described here. The primary difference is that the valve system 40" is substituted for the valve systems in the prior embodiments. The valve system 40" comprises a recirculation valve 46" essentially the same as the recirculation valve 46 of the second embodiment, and a pressure vessel valve 48". Whereas the control valve 44 and recirculation valve 46 of the second embodiment are arranged in series, in this third embodiment the recirculation valve 46" and pressure vessel valve 48" are effectively in parallel, each having its own connection to the intake system 12 of the engine. The pressure vessel valve 48" is controllable to be either open or closed (although optionally it can be openable in a variable fashion so as to control the pressure drop across the valve).

As shown in FIG. 3A, at engine conditions in which the compressor 22 is unable to supply adequate quantities of sufficiently supercharged air to the engine, the pressure vessel valve 48" is opened such that the engine's intake system 12 is supplied with air from the pressure vessel 16, and the recirculation valve 46" is placed in a recirculation position in which the valve's inlet is connected to the recirculation outlet such that compressed air from the compressor 22 is recirculated via the recirculation conduit 42 to the inlet 30 of the compressor, and the valve's outlet leading to the intake system 12 is closed off.

As shown in FIG. 3B, at engine conditions in which the compressor 22 is able to properly supercharge the engine, the pressure vessel valve 48" is closed and the recirculation valve 46" is placed in a non-recirculation position in which the valve's inlet is connected to the outlet that feeds the intake system 12 and the valve's recirculation outlet is closed off, such that the intake system is fed by the compressor 22.

In any of the embodiments described above or other variations of the turbocharger system, the valve(s) of the valve system can be an infinitely variable type that can be regulated so as to controllably vary the pressure drop, and hence the flow rate, of the air being supplied to the engine. The valve(s) can be controlled in such a fashion that the pressure or flow rate of the air supplied to the engine has a desired value.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A turbocharger system for an internal combustion engine that powers a vehicle having a pressure vessel storing pressurized air, the turbocharger system comprising:
    a turbocharger including a compressor driven by a turbine, the turbine defining an exhaust gas inlet for receiving exhaust gas from the engine and an exhaust gas outlet through which exhaust gas is discharged, the compressor defining an air inlet for receiving air to be compressed and an air outlet through which compressed air is discharged for delivery to an intake system of the engine;
    a valve system comprising a single valve defining a first inlet receiving compressed air from the compressor and a second inlet receiving pressurized air from the pressure vessel, the valve further defining a main outlet through which air is discharged for supply to the intake system of the engine, and a recirculation outlet through which compressed air received at the first inlet is diverted so as not to pass out the main outlet, the single valve being electrically controllable to move between first and second valve conditions in which either the pressurized air from the pressure vessel or the compressed air from the compressor is supplied to the intake system of the engine, respectively, the single valve shutting off the pressure vessel when in the second valve condition;
    wherein the single valve is further operable, when in the first valve condition, to divert the compressed air from the compressor through the recirculation outlet into a recirculation conduit that leads into the air inlet of the compressor, such that compressed air is recirculated back to the compressor when the air intake system is being supplied by the pressure vessel.

2. A method for operating a turbocharger system for an internal combustion engine, comprising the steps of:
    providing a turbocharger including a compressor driven by a turbine, the turbine defining an exhaust gas inlet for receiving exhaust gas from the engine and an exhaust gas outlet through which exhaust gas is discharged, the compressor defining an air inlet for receiving air to be compressed and an air outlet through which compressed air is discharged for delivery to an intake system of the engine;

providing a pressure vessel containing pressurized air;

providing a valve system comprising a single valve defining a first inlet receiving compressed air from the compressor and a second inlet receiving pressurized air from the pressure vessel, the valve further defining a main outlet through which air is discharged for supply to the intake system of the engine, and a recirculation outlet through which compressed air received at the first inlet is diverted so as not to pass out the main outlet, the single valve being electrically controllable to move between first and second valve conditions in which either the pressurized air from the pressure vessel or the compressed air from the compressor is supplied to the intake system of the engine, respectively, the single valve shutting off the pressure vessel when in the second valve condition;

selectively supplying an intake system of the engine with air either from the compressor or from the pressure vessel by placing the single valve in either the second valve condition or the first valve condition, respectively, dependent on at least one performance parameter of the engine; and when the pressure vessel is supplying the air to the intake system, recirculating compressed air from the air outlet of the compressor back to the air inlet of the compressor.

3. The method of claim 2, wherein the at least one performance parameter of the engine includes engine speed.

4. The method of claim 3, wherein the intake system is supplied by the pressure vessel when engine speed is below a predetermined value, and the intake system is supplied by the compressor when engine speed is above the predetermined value.

5. The method of claim 2, wherein the at least one performance parameter of the engine includes engine speed and engine throttle setting.

\* \* \* \* \*